April 30, 1946.　　C. D. PETERSON ET AL　　2,399,569
SYNCHRONIZING CLUTCH
Filed Oct. 21, 1943　　4 Sheets-Sheet 2
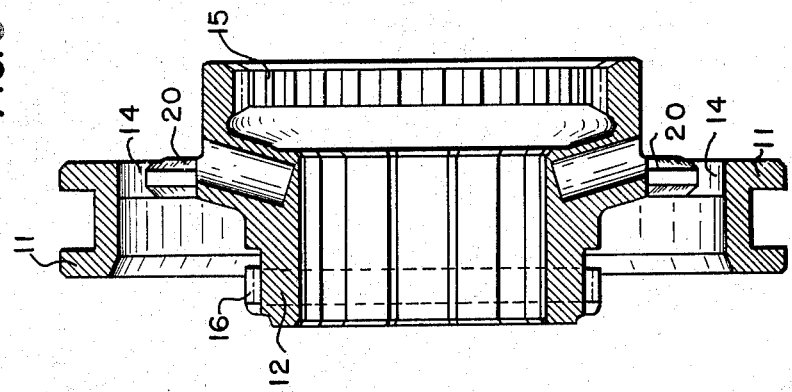
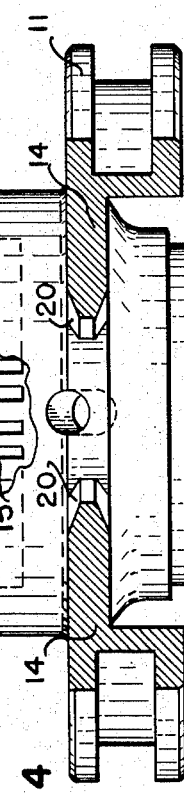
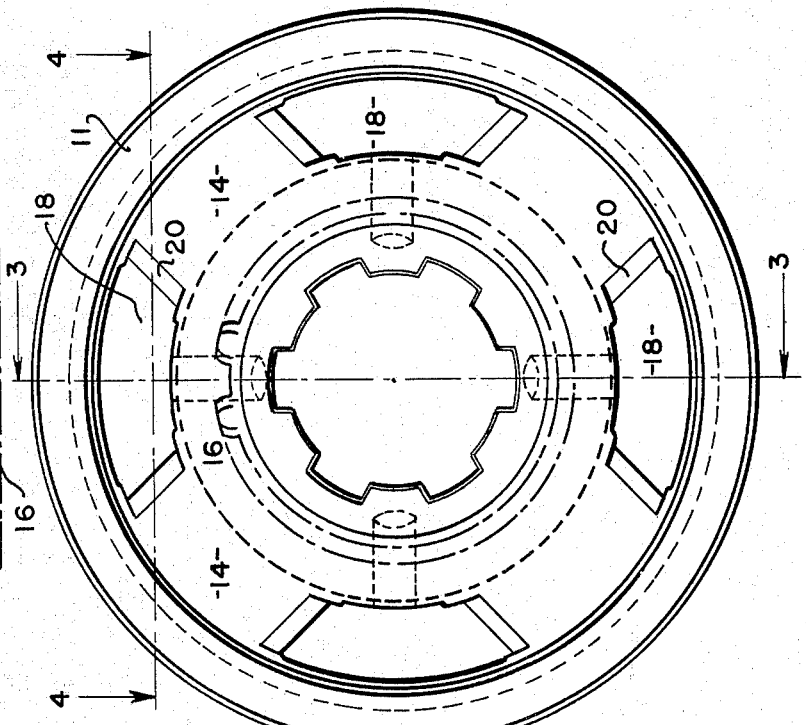
INVENTOR
CARL D. PETERSON
EDWARD W. ZINGSHEIM
BY *Bodell and Thompson*
ATTORNEYS.

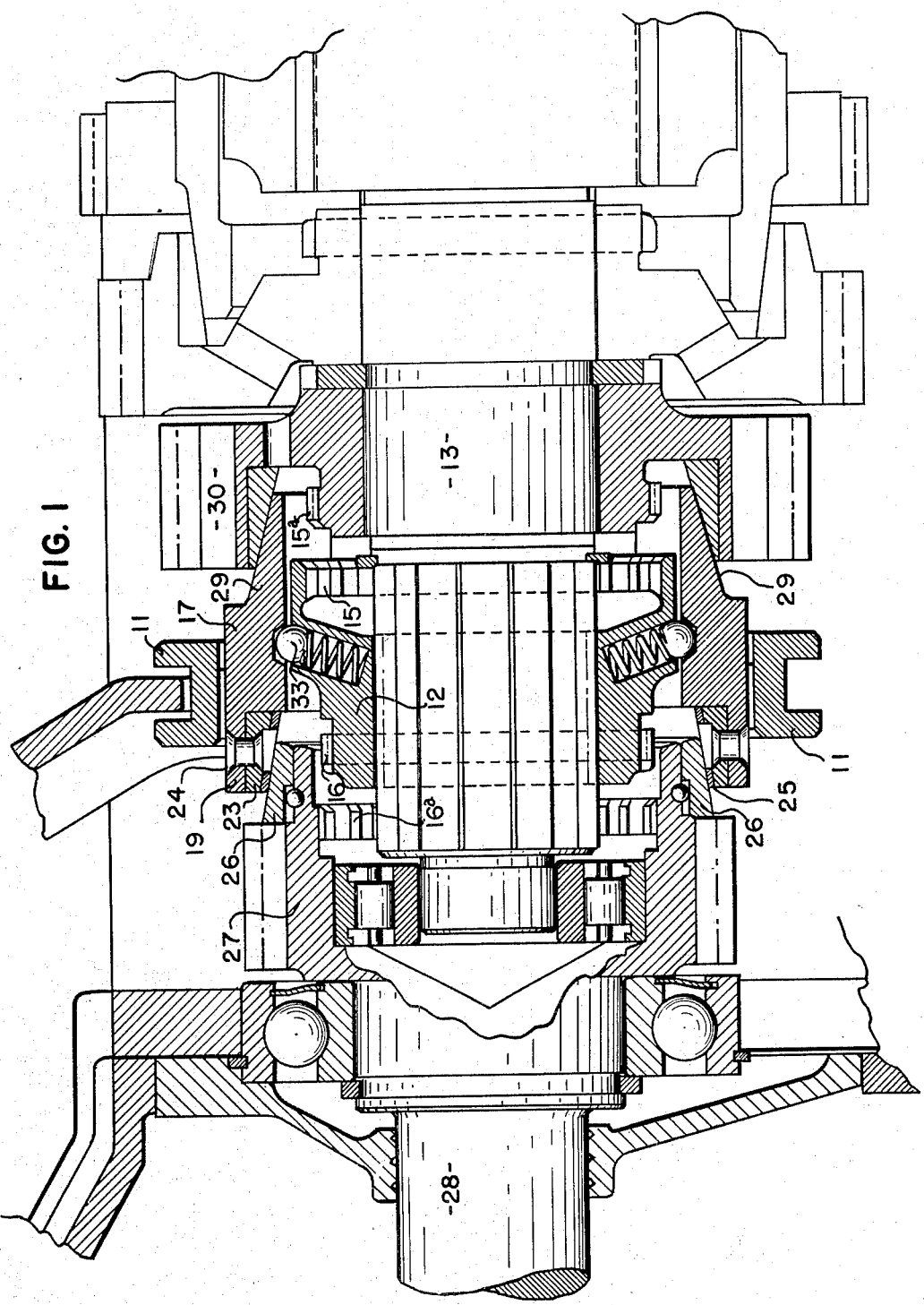

April 30, 1946.    C. D. PETERSON ET AL    2,399,569
SYNCHRONIZING CLUTCH
Filed Oct. 21, 1943    4 Sheets-Sheet 3
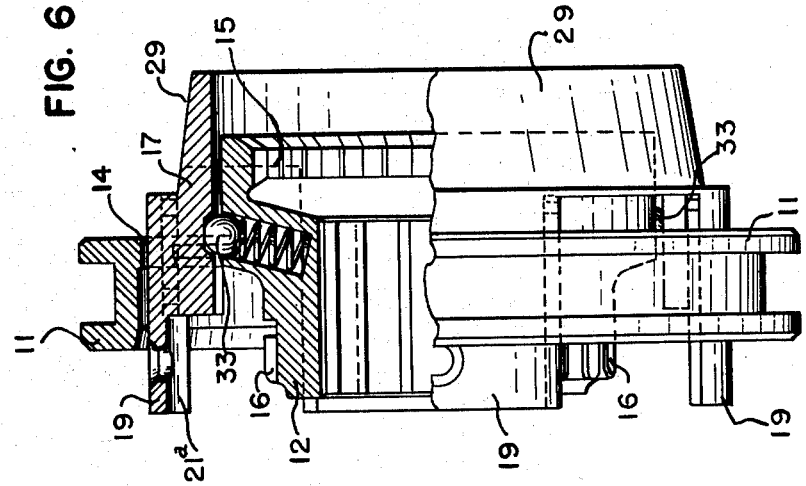
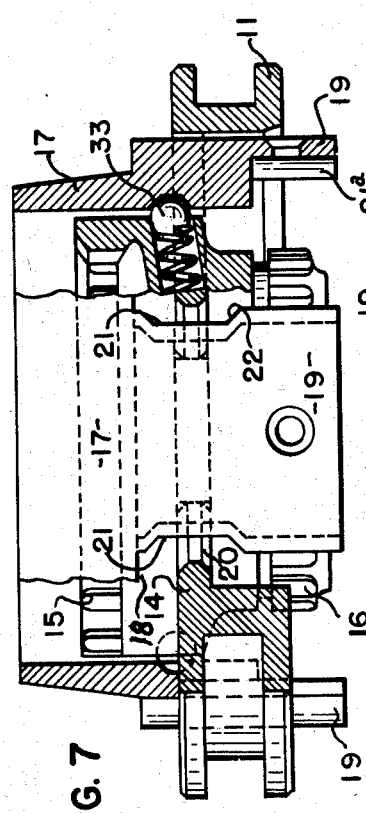
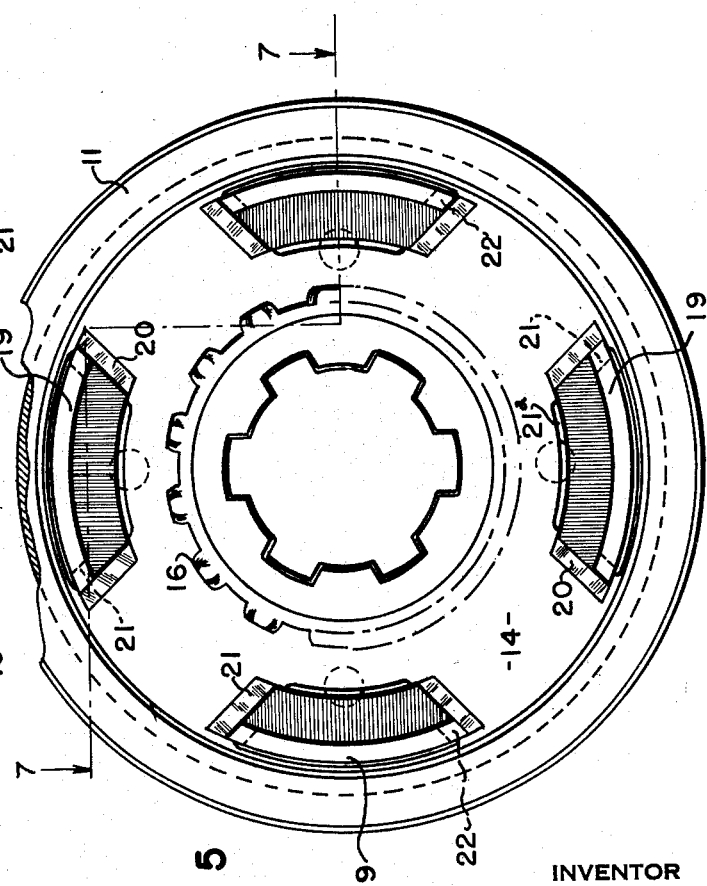
INVENTOR
CARL D. PETERSON
EDWARD W. ZINGSHEIM.
BY Bodell and Thompson
ATTORNEYS.

April 30, 1946.  C. D. PETERSON ET AL  2,399,569
SYNCHRONIZING CLUTCH
Filed Oct. 21, 1943   4 Sheets-Sheet 4
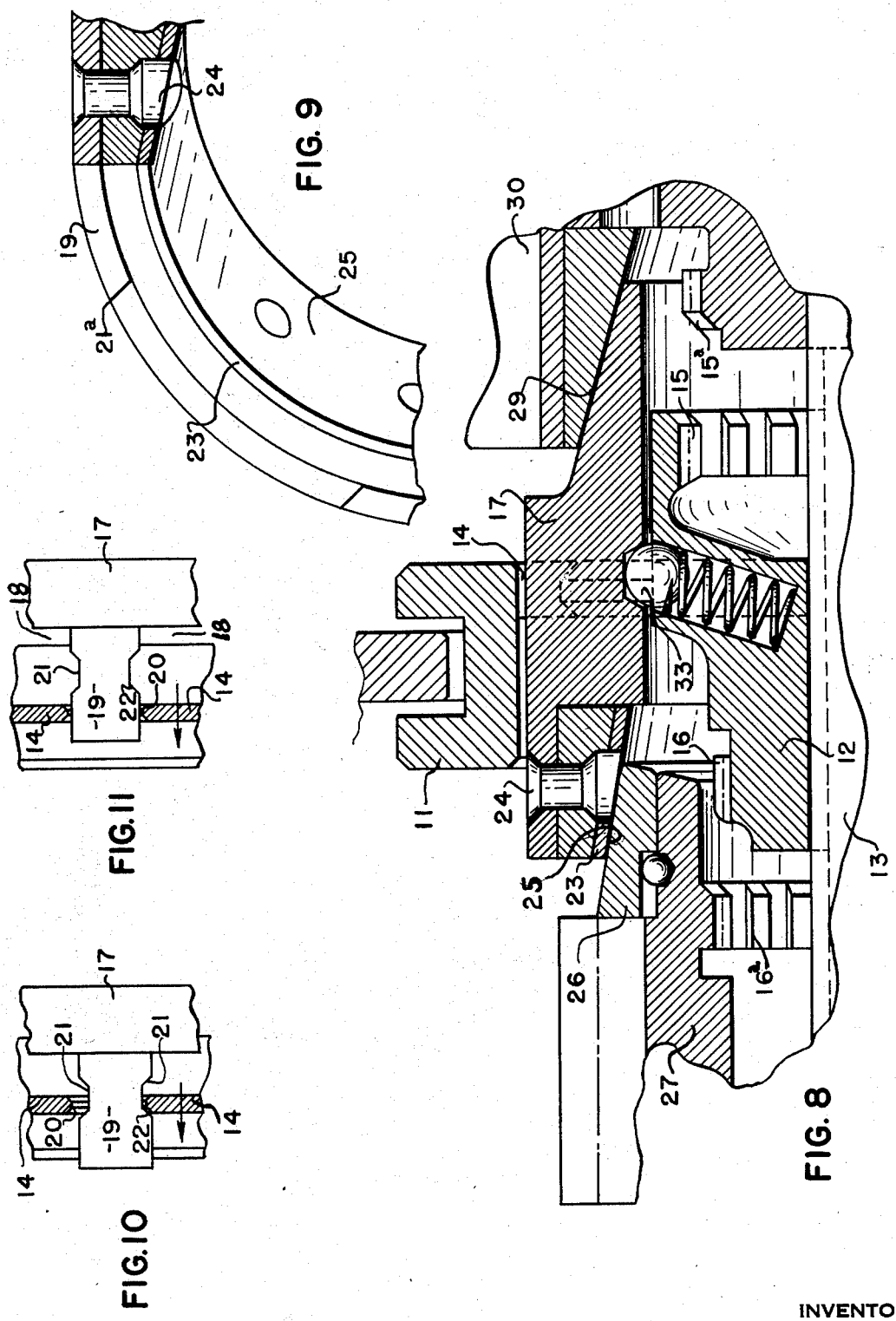
INVENTOR
CARL D. PETERSON
EDWARD W. ZINGSHEIM
BY Bodell and Thompson
ATTORNEYS.

Patented Apr. 30, 1946

2,399,569

UNITED STATES PATENT OFFICE 2,399,569

SYNCHRONIZING CLUTCH

Carl D. Peterson and Edward W. Zingsheim,
Toledo, Ohio

Application October 21, 1943, Serial No. 507,186

3 Claims. (Cl. 192—53)

This invention relates to synchronizing clutches of the type used in transmission gears, and has for its general object a synchronizing clutch consisting of a minimum number of readily assembled parts, so that the clutch may be economically manufactured. More specifically, it has for its object a synchronizing clutch including the toothed or jaw member and a sleeve friction member in which the toothed or jaw member includes an outer shifting collar, a hub and integral radial webs between the hub and the collar, and the friction sleeve is formed with slots opening through one end and terminating short of the other end providing prongs extending through the spaces between the end edges of the webs, together with a ring at one end of the sleeve, closing the open ends of the slots and secured to the prongs. If the clutch is a double one or shiftable in opposite directions from central position to produce two speeds, the ring may be provided with a friction face.

The invention consists in the novel features and in the combinations and constructions hereinafter set forth and claimed.

In describing this invention, reference is had to the accompanying drawings, in which like characters designate corresponding parts in all the views.

Figure 1 is a fragmentary sectional view of a gearing illustrating one form of this clutch mounted to shift in opposite directions from neutral to produce two different speeds.

Figure 2 is an elevation of the detached gear or toothed member or section of the clutch looking to the right in Figure 1.

Figures 3 and 4 are sectional views taken on lines 3—3 and 4—4, respectively, Figure 2.

Figure 5 is an elevation looking to the right in Figure 1 of the detached inner or friction member or section of the clutch, the ring at the left end of the friction member being removed.

Figure 6 is a diametrical sectional view, partly in elevation, of the assembled jaw or toothed and the friction members or sections of the clutch, the ring at the left end of the friction section being omitted.

Figure 7 is a view, partly in section, taken on lines 7—7, Figure 5 looking downwardly in Figure 6.

Figure 8 is an enlarged diagrammatic view of the clutch and coacting parts.

Figure 9 is an enlarged, perspective, fragmentary end view of the inner or friction clutch member looking to the left, the ring at the left end being included.

Figures 10 and 11 are fragmentary views illustrating the position of the friction and jaw clutch members with respect to the edges of the webs of the outer jaw section and the notches in the side edges of the prongs of the inner friction section at the start of a shift to the left and at the completion of the shift.

The synchronizing clutch comprises, generally, a shiftable section including a jaw or toothed member and a friction sleeve member, and means connecting the two members for causing them to move as a unit during the shifting operation, until the shifting movement of the sleeve is limited, and then permitting shifting movement of the jaw member relatively to the friction sleeve member. The jaw or toothed member comprises a shiftable collar 11 for coacting with the shifting fork of the gearing, an inner hub 12 slidably splined on a shaft 13 of the gearing and webs 14 between the collar 11 and the hub 12, the webs being spaced apart circumferentially. The toothed member is also formed at its opposite ends with internal and external clutch teeth or jaws 15 and 16, respectively.

17 designates the sleeve member, this being formed with slots 18 opening through one end thereof and terminating short of the other end providing prongs 19 which extend through the spaces between the end edges of the webs 14, each prong having an arcuate outer surface and an arcuate inner surface conforming to the curve of the inner face of the shifting collar 11 and the periphery of the hub respectively, as seen in Figures 2 to 4.

As seen in Figures 3, 4, 10 and 11, the webs 14 are formed with cams 20 at their end edges, which extend into notches 21 (Figures 7, 10 and 11), in the side walls of the prongs 19, these notches having beveled or cam end walls 22 for coacting with the beveled or cam end edges 20 of the webs 14. The prongs 19 are of less width than the spaces between the webs 14, in order to permit the sleeve 17 to have a rocking movement, within limits, relatively to the jaw member. As is well understood by those familiar with synchronizing clutches, when the speeds of the two parts to be clutched together are different, the sleeve member is moved circumferentially so that shifting in of the jaw member relative to the sleeve member is partially blocked by like beveled edges of the webs encountering the beveled edges at like ends of the notches 21. This blocking takes effect until the speeds synchronize or nearly synchronize when the shifting-in force causes the webs 14 to cam against the surfaces 22 of the notches and move the parts into such position that the webs 14 are in central position in the slots 21 and out of the notches, so that the completion of the shifting-in movement of the jaw or toothed member may be effected without blocking effect.

The end of the sleeve 17 through which the slots 21 open is provided with a ring 23 (Figures 1, 8 and 9), which is secured to the ends of the prongs and riveted thereto, as shown at 24. The ring 23 fits into channels 21a at the ends of the prongs. In a single synchronizing clutch, this ring is merely a retaining ring. In a double clutch, such as shown herein, this ring is made of friction material and is formed with an internal conical friction face 25 for coacting with a complemental conical face on a ring, as 26, provided on a drive member, as a gear 27, which is the drive gear of the gearing. The gear 27 is usually a stem gear integral with the input shaft 28 of the gearing. The other end of the sleeve is shown as formed with a peripheral conical friction surface 29 for coacting with an internal conical friction face on a gear 30 mounted on the shaft 13 and meshing with a gear on the countershaft of the gearing, as is well understood. The clutch teeth 15 and 16 respectively coact with complemental clutch teeth 15a and 16a on the gears 30 and 27 respectively.

The toothed member or the hub 12 thereof is connected to the friction sleeve 17 by any suitable means, here shown as yielding means or spring-pressed poppets, as 33, located in suitable sockets in the hub 12 and pressed into an internal annular groove in the sleeve having cam-shaped or beveled side walls. The pressure of the poppets is so adjusted that upon shifting of the collar 11, the sleeve moves with the jaw member, that is, with the collar 11 and the hub 12 as a unit, one or the other of the friction faces 29 or 23 engaging with the complemental friction face of the gear 30 or 27, and thus limits further shifting of the sleeve. While the differential speed between the two parts to be clutched together is relatively great, shifting in of the toothed clutch member will be prevented or blocked, as before described, by the webs 14 encountering the end walls 22 of the notches in the prongs 19. When the speeds are synchronized or nearly so, continued shifting-in pressure causes the poppets to be depressed, permitting the toothed clutch member to be shifted to engage the teeth 15 or 16 with complemental teeth 15a or 16a of the gear 30 or 27.

This synchronizing clutch consists of a minimum number of parts, as the toothed member is but one part instead of several parts, as heretofore constructed.

What we claim is:

1. A shiftable synchronizing clutch for connecting driving and driven members together including a shiftable section on one of said members for coacting with a complemental section on the other of the said members, the shiftable section including two one-piece main elements, one being a wheel-like toothed member having a hub, a shifting collar radially spaced from the hub and radially-extending, arcuate webs between the collar and the hub providing spaces, and integral therewith, and the other element being a friction sleeve formed with integral lengthwise prongs for passing through the spaces between the webs and slidably fitting the outer wall of the hub and the inner wall of the collar, the end edges of the webs and the side edges of the prongs having coacting blocking means for restraining shifting of the toothed member relatively to the sleeve, until the speeds of the driving and driven members are substantially synchronized, and means carried by the hub for normally yieldingly restraining relative axial movement of the two elements.

2. A shiftable synchronizing clutch for connecting driving and driven members together including a shiftable section on one of said members for coacting with a complemental section on the other of the said members, the shiftable section including two one-piece main elements, one being a wheel-like toothed member having a hub, a shifting collar radially spaced from the hub and radially-extending, arcuate webs between the collar and the hub providing spaces, and integral therewith, and the other element being a friction sleeve formed with integral lengthwise prongs for passing through the spaces between the webs and slidably fitting the outer wall of the hub and the inner wall of the collar, the end edges of the webs and the side edges of the prongs having coacting blocking means for restraining shifting of the toothed member relatively to the sleeve, until the speeds of the driving and driven members are substantially synchronized, and means carried by the hub for normally yieldingly restraining relative axial movement of the two elements, the sleeve member including a separable part for closing the spaces between the ends of the prongs.

3. A shiftable synchronizing clutch for connecting driving and driven members together including a double shiftable section on one of said members and shiftable in opposite directions from neutral for coacting with complemental sections rotatable with the other of the said members, the shiftable section including two one-piece main elements, one being a wheel-like toothed member having a hub, a shifting collar radially spaced from the hub and radially-extending, arcuate webs between the collar and the hub providing spaces, and integral therewith, and the other element being a friction sleeve formed with integral lengthwise prongs for passing through the spaces between the webs and slidably fitting the outer wall of the hub and the inner wall of the collar, the end edges of the webs and the side edges of the prongs having coacting blocking means for restraining shifting of the toothed member relatively to the sleeve, until the speeds of the driving and driven members are substantially synchronized, and means carried by the hub for normally yieldingly restraining relative axial movement of the two elements, the sleeve member including a separable part for closing the spaces between the ends of the prongs, and the toothed element being also provided with a set of clutch teeth on each end thereof, those at one end being correlated with the friction member on said space closing part.

CARL D. PETERSON.
EDWARD W. ZINGSHEIM.